(12) United States Patent
Strickland

(10) Patent No.: US 11,292,305 B2
(45) Date of Patent: Apr. 5, 2022

(54) CHANNEL HITCH LOCK ASSEMBLY

(71) Applicant: John Strickland, Marietta, GA (US)

(72) Inventor: John Strickland, Marietta, GA (US)

(*) Notice: Subject to any disclaimer, the term of this patent is extended or adjusted under 35 U.S.C. 154(b) by 413 days.

(21) Appl. No.: 16/532,610

(22) Filed: Aug. 6, 2019

(65) Prior Publication Data

US 2021/0039458 A1     Feb. 11, 2021

(51) Int. Cl.
  *B60D 1/60*    (2006.01)
  *B60D 1/46*    (2006.01)
  *E05B 67/36*   (2006.01)

(52) U.S. Cl.
  CPC .......... *B60D 1/60* (2013.01); *B60D 1/46* (2013.01); *E05B 67/36* (2013.01)

(58) Field of Classification Search
  CPC .................................. B60D 1/60; B60D 1/46
  See application file for complete search history.

(56) References Cited

U.S. PATENT DOCUMENTS 8,661,745 B2 * 3/2014 Bachman ............... B60D 1/58
                                                   52/155
9,573,430 B2 * 2/2017 Elliott ..................... B60D 1/46

* cited by examiner

*Primary Examiner* — Kevin Hurley
(74) *Attorney, Agent, or Firm* — Thomas | Horstemeyer, LLP

(57) ABSTRACT

Disclosed are various embodiments for a channel hitch lock. The channel hitch lock includes a first corner assembly configured to engage with a first side of a channel hitch and cover at least a portion of the channel hitch, the first corner assembly having a bottom projection configured to encapsulate a bottom recess of the channel hitch; and a second corner assembly configured to couple with the first corner assembly and together encapsulate at least an entire front portion of the channel hitch, wherein the second corner assembly is further configured to engage with a second side of the channel hitch and cover a second portion of the channel hitch, the second corner assembly having a top projection configured to encapsulate a top recess of the channel hitch.

18 Claims, 8 Drawing Sheets

CHANNEL HITCH LOCK ASSEMBLY

BACKGROUND

Various types of hitches exist for allowing a truck, tractor, or other vehicle to couple to a trailer for purposes of towing the trailer or objects thereon. One type of device includes a channel hitch, which allows an operator to adjust the height of a trailer coupler to better match a height of a hitch ball on their vehicle. Matching the trailer coupler height to the vehicle makes the trailer travel parallel with the ground, thereby reducing the likelihood of the cargo shifting, eliminating uneven wear on the wheels and axles, and improving the overall quality of pulling the trailer.

Channel hitches include the ability of the trailer coupler being removed entirely, reducing the ease of theft. However, depending on time and resources, a thief can simply attach their own trailer coupler and pull the trailer away.

Many products allow a trailer owner to lock the trailer coupler, but with a removable trailer coupler the thief can simply remove that trailer coupler and lock, add their own coupler, and steal the trailer. To effectively lock a trailer with a channel hitch, a lock mechanism must be directly applied to the channel hitch itself. Currently, no product exists to provide this security.

BRIEF DESCRIPTION OF THE INVENTION

According to various embodiments, a channel hitch lock is provided that comprises a first corner assembly configured to engage with a first side of a channel hitch and cover at least a portion of the channel hitch, the first corner assembly having a bottom projection configured to encapsulate a bottom recess of the channel hitch; and a second corner assembly configured to couple with the first corner assembly and together encapsulate at least an entire front portion of the channel hitch, wherein the second corner assembly is further configured to engage with a second side of the channel hitch and cover a second portion of the channel hitch, the second corner assembly having a top projection configured to encapsulate a top recess of the channel hitch.

The channel hitch lock may include a first lock tab projecting from the first corner assembly; a second lock tab projecting from the second corner assembly; a puck-type lock configured to couple to the channel hitch lock and retain the first corner assembly with the second corner assembly in a mated configuration; and a lock guard configured to encapsulate the first lock eye, the second lock eye, and the puck-type lock.

Further, the puck-type lock may have a circular body. As such, the lock guard may be a circular lock guard projecting from a front surface of the first corner assembly, the circular lock guard being configured to extend along a circumference of the puck-type lock. In some embodiments, the circular lock guard comprises an aperture and the puck-type lock has a projection with a width substantially similar to a width of the aperture, the projection being configured to nest in the aperture when the puck-type lock is engaged within the circular lock guard.

The first corner assembly may include a first plurality of retaining pins positioned on an interior surface of the first corner assembly, the first plurality of retaining pins being configured to be positioned in a first plurality of holes on a first side of the channel hitch; and the second corner assembly may include a second plurality of retaining pins positioned on an interior surface of the second corner assembly, the second plurality of retaining pins being configured to be positioned in a second plurality of holes on a second side of the channel hitch.

Further, according to various embodiments, a method is provided, comprising: providing a channel hitch lock, comprising: a first corner assembly configured to engage with a first side of a channel hitch and cover at least a portion of the channel hitch, the first corner assembly having a bottom projection configured to encapsulate a bottom recess of the channel hitch; a second corner assembly configured to couple with the first corner assembly and together encapsulate at least an entire front portion of the channel hitch, wherein the second corner assembly is further configured to engage with a second side of the channel hitch and cover a second portion of the channel hitch, the second corner assembly having a top projection configured to encapsulate a top recess of the channel hitch; and a lock configured to couple to the channel hitch lock and retain the first corner assembly with the second corner assembly in a mated configuration; positioning the first corner assembly on the first side of the channel hitch; positioning the second corner assembly on the second side of the channel hitch such that the entire front portion of the hitch is encapsulated; and locking the first corner assembly to the second corner assembly.

The lock may include a puck-type lock. The method may further include providing a first lock tab projecting from the first corner assembly; and providing a second lock tab projecting from the second corner assembly. Additionally, the method may include providing a lock guard configured to encapsulate the first lock eye, the second lock eye, and the puck-type lock.

In some embodiments, the lock is a puck-type lock having a circular body; and the lock guard further comprises a circular lock guard projecting from a front surface of the first corner assembly, the circular lock guard being configured to extend along a circumference of the puck-type lock. Further, the circular lock guard may include an aperture; and the puck-type lock may include a projection having a width substantially similar to a width of the aperture, the projection being configured to nest in the aperture when the puck-type lock is engaged within the circular lock guard.

The first corner assembly may include a first plurality of retaining pins positioned on an interior surface of the first corner assembly, the first plurality of retaining pins being configured to be positioned in a first plurality of holes on a first side of the channel hitch; and the second corner assembly may include a second plurality of retaining pins positioned on an interior surface of the second corner assembly, the second plurality of retaining pins being configured to be positioned in a second plurality of holes on a second side of the channel hitch.

The method further comprises positioning the first plurality of retaining pins into the first plurality of holes on the first side of the channel hitch; and positioning the second plurality of retaining pins into the second plurality of holes on the second side of the channel hitch.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
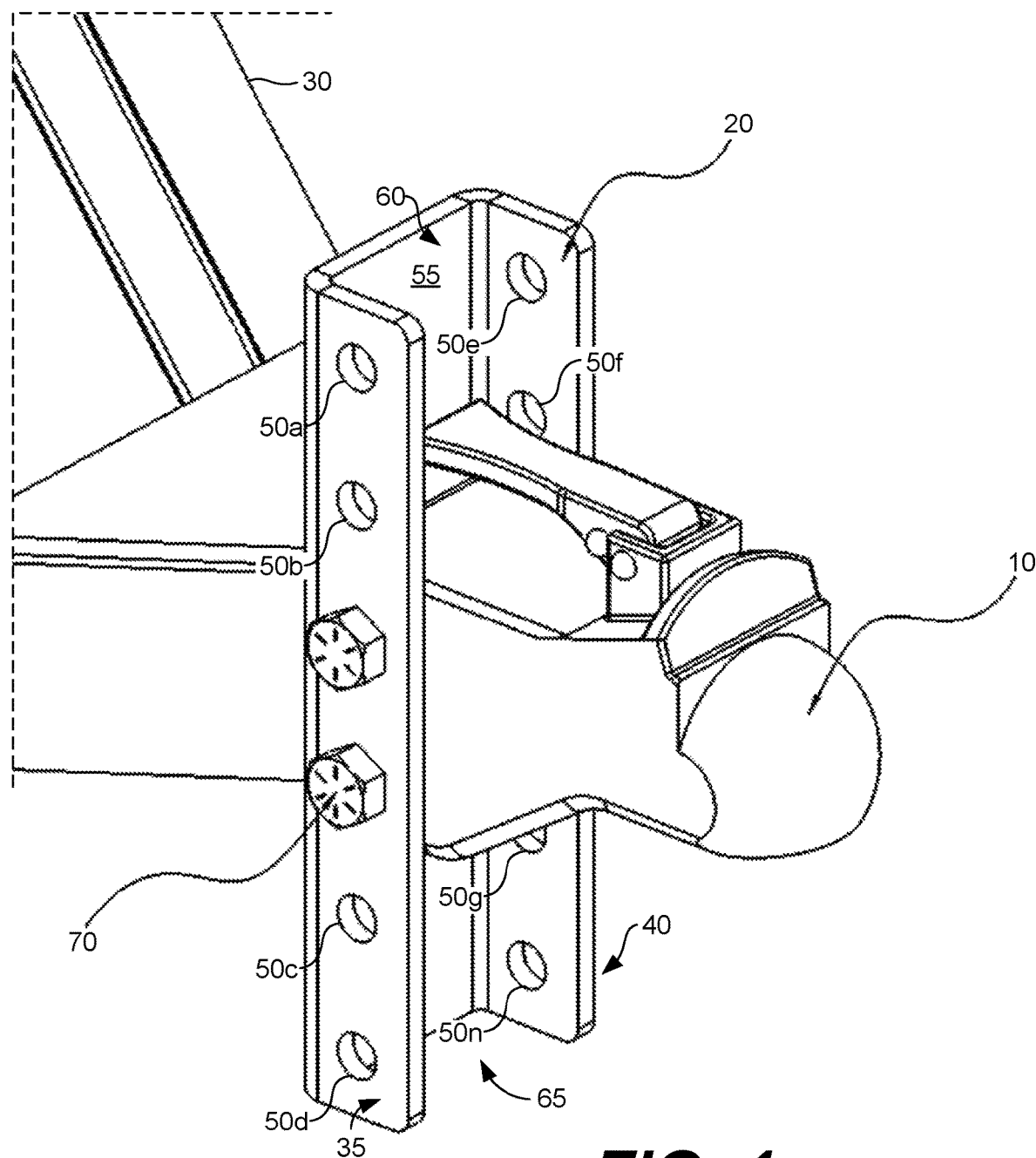
FIG. 1 shows an example of a trailer coupler attached to a channel hitch, which can be used to tow a trailer according to various embodiments of the present disclosure.

The present disclosure relates to a locking device that can be used to lock a channel hitch or similar apparatus according to various embodiments.

As noted above, channel hitches allow operators to adjust a height of a trailer coupler to better match a height of a hitch ball on their vehicle. In other words, the trailer coupler can be repositioned, either upwards or downwards, along a height of the channel hitch to accommodate for any height disparity between a ball hitch of a vehicle and a tongue of the trailer. As may be appreciated, channel hitches are desirable as matching the trailer coupler height to the vehicle makes the trailer travel parallel with the ground, thereby reducing the likelihood of the cargo shifting, eliminating uneven wear on the wheels and axles, and improving the overall quality of towing the trailer.

However, channel hitches are incredibly susceptible to theft. While channel hitches have the ability of the trailer coupler being removed entirely, somewhat reducing the ease of theft, depending on time and resources, a thief can simply attach their own trailer coupler and pull the trailer away. Many products allow a trailer owner to lock the trailer coupler, but with a removable trailer coupler the thief can simply remove that trailer coupler and lock, add their own coupler, and steal the trailer. To effectively lock a trailer with a channel hitch, a lock mechanism must be directly applied to the channel hitch itself.

Accordingly, in various embodiments, a channel hitch lock is described that comprises a first corner assembly configured to engage with a first side of a channel hitch and cover at least a portion of the channel hitch. The first corner assembly may include a bottom projection configured to encapsulate a bottom recess of the channel hitch. The channel hitch lock may further include a second corner assembly configured to couple or mate with the first corner assembly and together encapsulate at least an entire front portion of the channel hitch. The second corner assembly, like the first corner assembly, is configured to engage with a second side of the channel hitch and cover a second portion of the channel hitch. Also, the second corner assembly may include a top projection configured to encapsulate a top recess of the channel hitch.

Further, the channel hitch lock may include a first lock tab projecting from the first corner assembly and a second lock tab projecting from the second corner assembly. In some embodiments, the channel hitch lock may include a lock, such as a puck-type lock, configured to couple to the channel hitch lock and retain the first corner assembly with the second corner assembly in a mated configuration. Also, the channel hitch lock may include a lock guard configured to encapsulate the first lock eye, the second lock eye, and the lock (e.g., the puck-type lock).

In instances in which the lock includes a puck-type lock, the puck-type lock may have a circular body. As such, the lock guard may be a circular lock guard projecting from a front surface of the first corner assembly, the circular lock guard being configured to extend along a circumference of the puck-type lock. In some embodiments, the circular lock guard comprises an aperture and the puck-type lock has a projection with a width substantially similar to a width of the aperture. The projection may be configured to nest in the aperture when the puck-type lock is engaged within the circular lock guard.

The first corner assembly may include a first plurality of retaining pins positioned on an interior surface of the first corner assembly. The first plurality of retaining pins may be configured to be positioned in a first plurality of holes on a first side of the channel hitch. The second corner assembly may include a second plurality of retaining pins positioned on an interior surface of the second corner assembly. Similarly, the second plurality of retaining pins may be configured to be positioned in a second plurality of holes on a second side of the channel hitch.

In the following discussion, a general description of the channel hitch lock and its components is provided, followed by a discussion of the operation of the same.

Turning now to FIG. 1, an example of a trailer coupler 10 attached to a channel hitch 20 is shown, where the channel hitch 20 and the trailer coupler 10 can be used to tow a trailer 30 according to various embodiments of the present disclosure. As can be seen in FIG. 1, the channel hitch 20 includes a first channel hitch side 35 and a second channel hitch side 40, where a plurality of holes 50a . . . 50n (collectively "holes 50") are evenly spaced on both the first channel hitch side 35 (also referred to herein as a first side 35) and the second channel hitch side 40 (also referred to herein as a second side 40). Each of the holes 50 on the first channel hitch side 35 directly correspond to a respective hole 50 on the second channel hitch side 40, where the holes 50 on each side are parallel relative to a reference surface, such as the ground or bottom of the channel hitch 20.

The channel hitch further includes a channel hitch back plate 55. The channel hitch back plate 55, as well as the first channel hitch side 35 and the second channel hitch side 40 projecting at an approximate 90 degree angle therefrom, define a top recess 60 and a bottom recess 65. The trailer coupler 10 nests between the first channel hitch side 35 and the second channel hitch side 40 such that a rear portion of the trailer coupler 10 touches, is close to, or otherwise is positioned relative to the channel hitch back plate 55. For instance, in some situations, bolts may retain the trailer coupler 10 a predetermined distance from the channel hitch back plate 55 such that a slight spacing exists between the trailer coupler 10 and the channel hitch back plate 55.

As may be appreciated, by virtue of the holes 50, the trailer coupler 10 can be moved upwards or downwards (or, in other words, vertically) along a body of the channel hitch 20, for instance, to accommodate for a height disparity between a trailer ball of a vehicle and the trailer 30 (or tongue of the trailer 30). Nuts and bolts 70, or other suitable locking mechanisms (e.g., pins and rods), can secure the trailer coupler 10 to the channel hitch 20 through the holes 50. However, these nuts and bolts 70 are easily removed, and are commonly removed to remove the trailer coupler 10 such that the trailer 30 and its components are more difficult to steal.

As noted above, however, a thief can simply attach their own trailer coupler 10 and pull the trailer 30 away. Many products allow a trailer owner to lock the trailer coupler 10, but with a removable trailer coupler 10 the thief can simply remove that trailer coupler 10 and lock, add their own trailer coupler 10, and steal the trailer 30. To effectively lock a trailer with a channel hitch 20, a lock mechanism must be directly applied to the channel hitch 20 itself.

Figure 2:
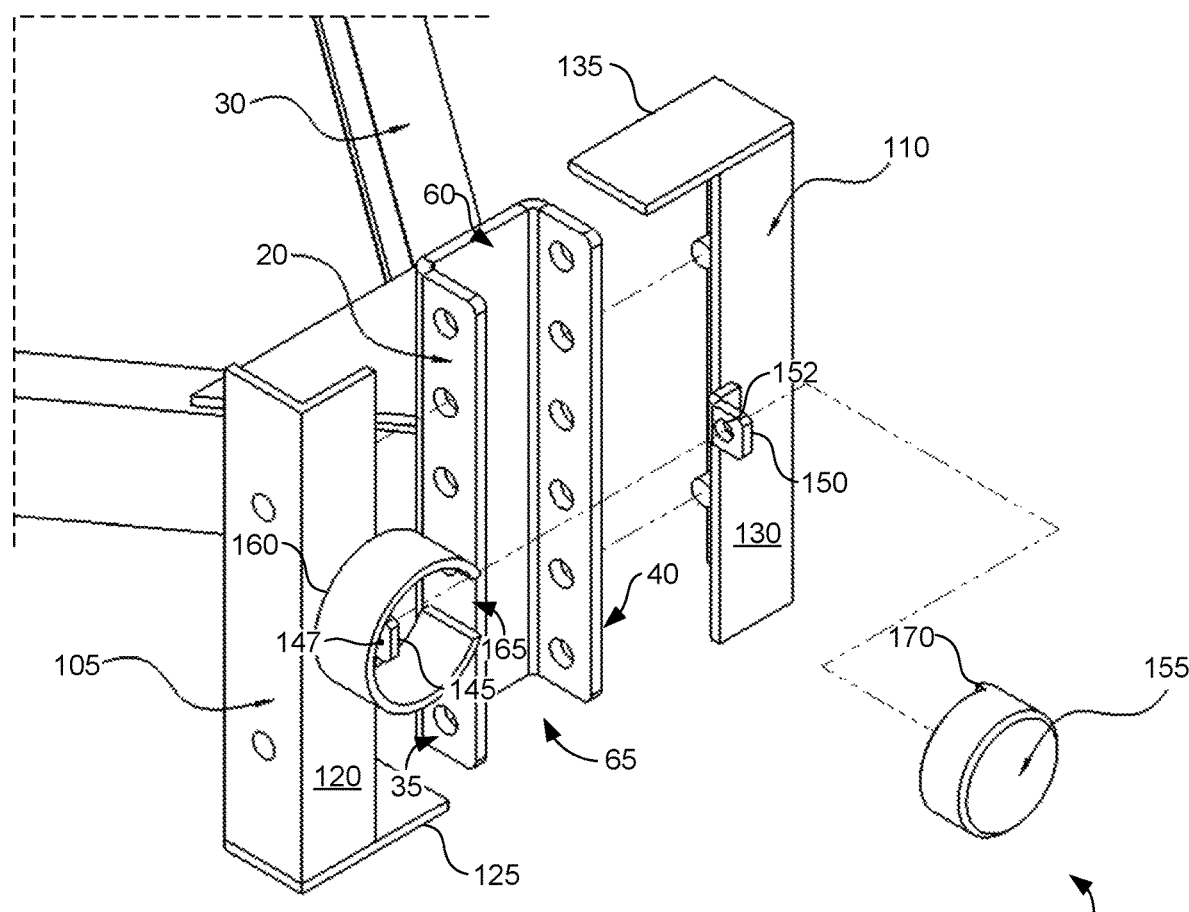
FIG. 2 shows an exploded, perspective view of a channel hitch lock according to various embodiments of the present disclosure.

Moving along to FIG. 2, an exploded, perspective view of a channel hitch lock 100 is shown according to various embodiments of the present disclosure. The channel hitch lock 100 may include a first corner assembly 105 and a second corner assembly 110, among other components as will be described. The first corner assembly 105 may be configured to engage with the first channel hitch side 35 of the channel hitch 20. When engaged with the first channel hitch side 35, the first corner assembly 105 includes a face plate 120 that covers at least a portion of the channel hitch 20. Further, in some embodiments, the first corner assembly 105 may include a bottom projection 125 configured to encapsulate the bottom recess 65 of the channel hitch 20.

The top projection 135 and the bottom projection 125 may be referred to as "guard plates." For instance, the top projection 135 and the bottom projection 125 collectively act as guard plates as they prevent tampering with the retaining pins, reduce visibility of the interior components of the channel hitch 20 and the channel hitch lock 100, eliminate prying locations, and reduce the potential for custom hitches that might altogether circumvent the channel hitch 20.

Similar to the first corner assembly 105, the second corner assembly 110 may be configured to engage with the second channel hitch side 40 of the channel hitch 20. When engaged with the second channel hitch side 40, the second corner assembly 110 includes a face plate 130 that covers at least a portion of the channel hitch 20. In some embodiments, the face plate 130 of the second corner assembly 110 covers a different portion than that covered by the face plate 120 of the first corner assembly 105. In some embodiments, the face plates 120, 130 may overlap. Further, in some embodiments, the second corner assembly 110 may include a top projection 135 configured to encapsulate the top recess 60 of the channel hitch 20.

Figure 3:
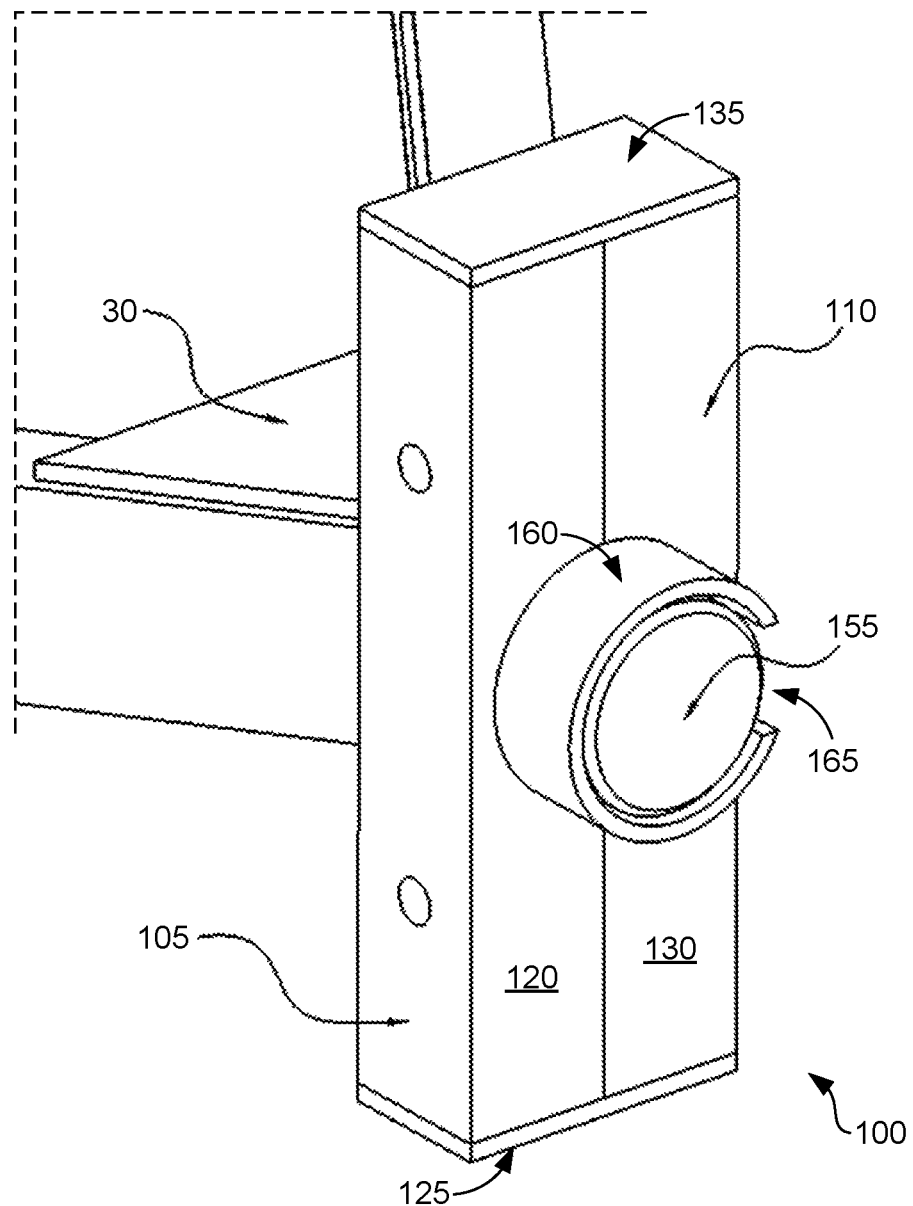
FIG. 3 shows an assembled, perspective view of a channel hitch lock according to various embodiments of the present disclosure.

FIG. 3 shows an assembled, perspective view of the channel hitch lock 100 according to various embodiments of the present disclosure. As shown in FIG. 3, the second corner assembly 110 may be configured to couple or mate with the first corner assembly 105 and, together, encapsulate at least an entire front portion of the channel hitch 20. The second corner assembly 110, like the first corner assembly 105, is configured to engage with the second side 40 of the channel hitch 20 and cover a second portion of the channel hitch 20.

Referring back to the exploded, perspective view of FIG. 2, in further embodiments, the channel hitch lock 100 may include a first lock tab 145 projecting from the first corner assembly 105 and a second lock tab 150 projecting from the second corner assembly 110. The first lock tab 145 may include an L-bracket in some embodiments having a first lock eye 147 or, in other words, an aperture for receiving a lock. Similarly, the second lock tab 150 may include an L-bracket in some embodiments having a second lock eye 152 or an aperture for receiving a lock. When the first corner assembly 105 and the second corner assembly 110 are coupled or mated (e.g., when the channel hitch lock 100 is assembled), the first lock tab 145 and the second lock tab 150 may touch or be positioned closely together, such that the first lock tab 145 and the second lock tab 150 are aligned to receive a lock, securing the first corner assembly 105 to the second corner assembly 110, as may be appreciated. It is understood the first lock tab 145 and the second lock tab 150 may include configurations other than an L-bracket in various embodiments.

In some embodiments, the channel hitch lock 100 may further include a lock, such as a puck-type lock 155. A puck-type lock 155 can be desirable as it has a hidden shackle, but other types of locks having hidden shackles can be employed. Notably, the puck-type lock 155 may be configured to couple to the channel hitch lock 100, for instance, through an aperture defined by the first lock tab 145 and second lock tab 150 (when touching and aligned). As such, the puck-type lock 155 may be described as retaining the first corner assembly 105 with the second corner assembly 110 in a mated configuration.

In further embodiments, the channel hitch lock 100 may include a lock guard 160 configured to encapsulate the first lock tab 145, the second lock tab 150, as well as the first lock eye 147, the second lock eye 152, and the lock (e.g., the puck-type lock 155). The lock guard 160 prevents tampering with the lock, such as the puck style lock 155.

In instances in which the channel hitch lock 100 includes the puck-type lock 155, the puck-type lock 155 may have a circular body. As such, the lock guard 160 may be a circular lock guard 160 projecting from a front surface, or a face plate 120, of the first corner assembly 105. The circular lock guard 160 may include an annular projection extending along a circumference of the puck-type lock 155 in some embodiments. In some embodiments, the circular lock guard 160 closely conforms to a body of the puck-type lock 155 such that it is difficult or impossible to pry away the puck-type lock 155 from various positions. However, the aperture 165 in the circular lock guard 160 permits the puck-type lock 155 to be accessed by an operator.

Additionally, in some embodiments, the circular lock guard 160 may include an aperture 165. The puck-type lock 155 has a projection 170 that corresponds to and nests within the aperture 165 when the puck-type lock 155 is secured to the channel hitch lock 100. The projection 170 may have a width substantially similar to a width of the aperture 165. As such, the projection 170 may be configured to nest in the aperture 165 when the puck-type lock 155 is nested within or otherwise engaged with the circular lock guard 160.

Figure 4:
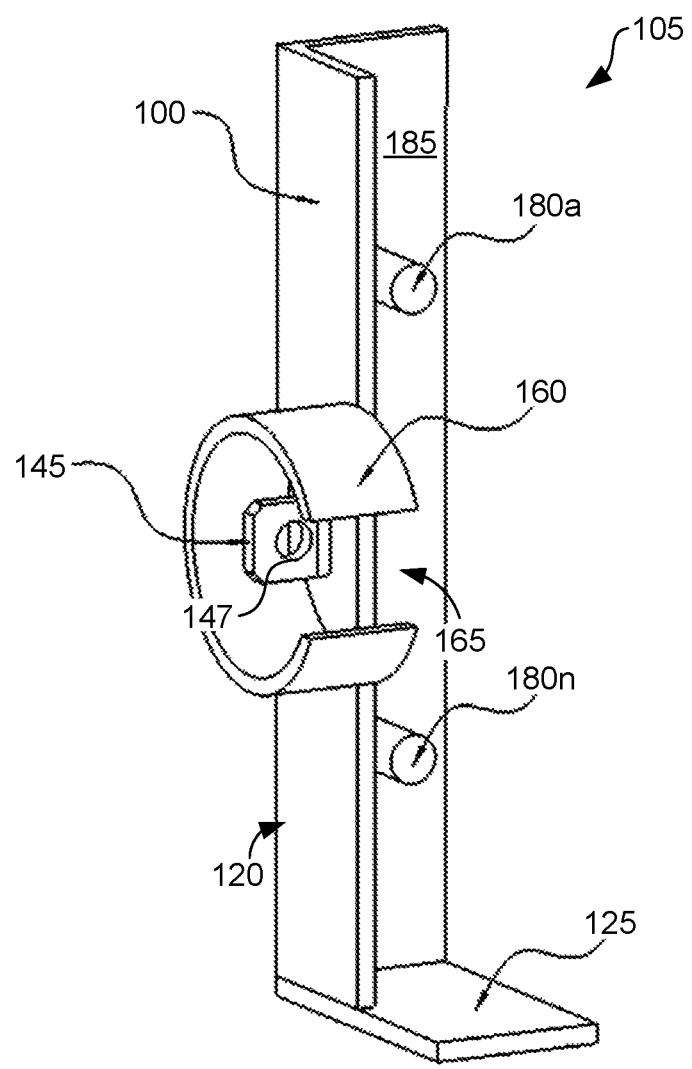
FIG. 4 shows a perspective side view of a first corner assembly of the channel hitch lock according to various embodiments of the present disclosure.

Moving along to FIG. 4, a perspective side view of the first corner assembly 105 of the channel hitch lock 100 is shown according to various embodiments of the present disclosure. The first corner assembly 105 may include a first plurality of retaining pins 180a . . . 180n (collectively "first set of retaining pins 180"). In some embodiments, the first set of retaining pins 180 may be positioned on or through an interior surface 185 of the first corner assembly 105. In some embodiments, the retaining pins 180 may go through the corner assembly 105. For instance, the retaining pins 180 may be structures welded inside a hole in the first corner assembly 105. The first set of retaining pins 180 may be configured to be positioned in a first plurality of holes 50 on the first channel hitch side 35 of the channel hitch 20. In some embodiments, the first set of retaining pins 180 includes two retaining pins 180, although other numbers of retaining pins 180 may be used.

Figure 5:
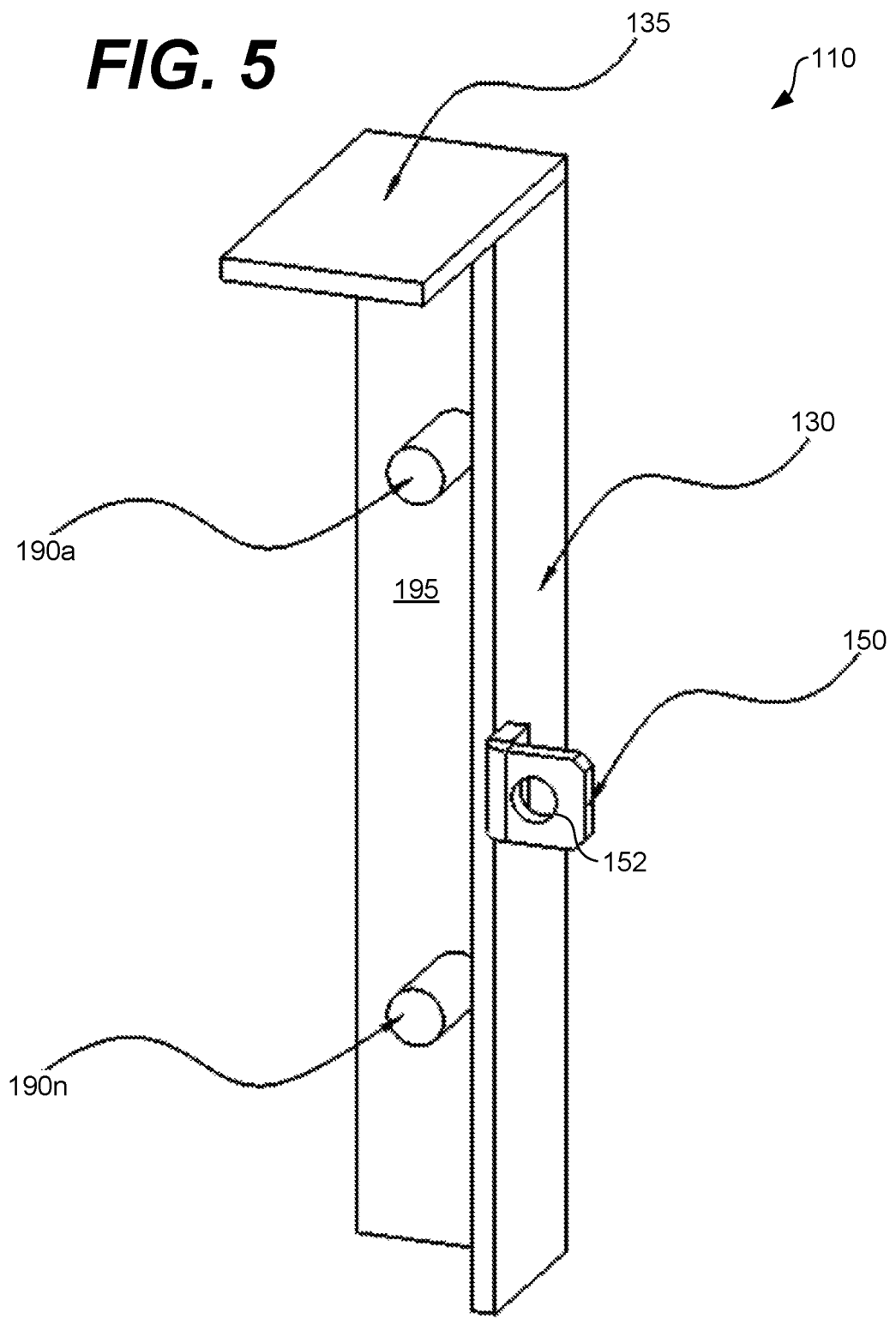
FIGS. 5 and 6 show perspective side views of a second corner assembly of the channel hitch lock according to various embodiments of the present disclosure.
Figure 6:
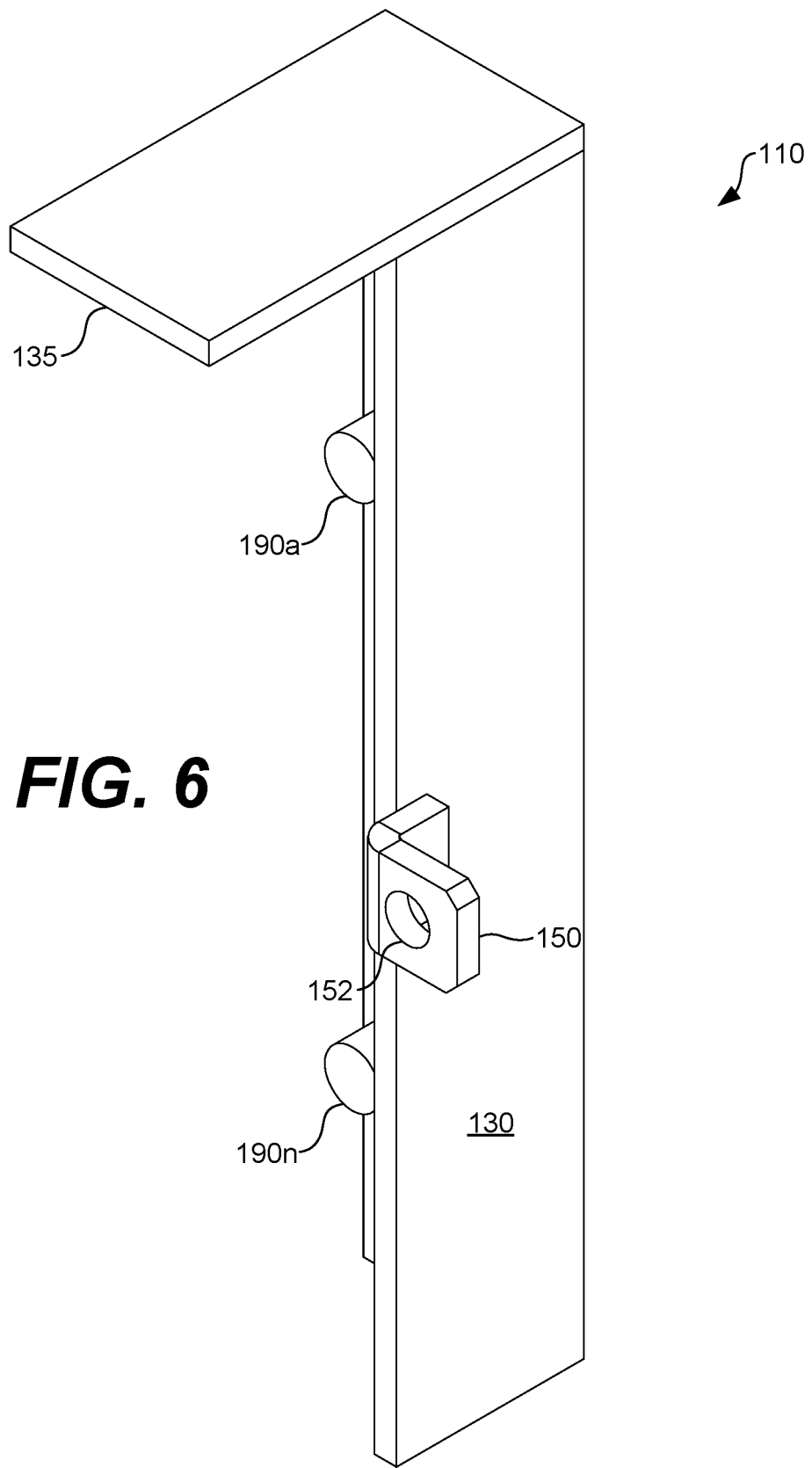

FIGS. 5 and 6 show perspective side views of a second corner assembly of the channel hitch lock according to various embodiments of the present disclosure. Similar to the first corner assembly 105, the second corner assembly 110 may include a second plurality of retaining pins 190a . . . 190n (collectively "second set of retaining pins 190"). In some embodiments, the second set of retaining pins 190 may be positioned on an interior surface 195 of the second corner assembly 110. Similar to the first set of retaining pins 180, the second set of retaining pins 190 may be configured to be positioned in a second plurality of holes 50 on the second channel hitch side 40 of the channel hitch 20. In some embodiments, the second set of retaining pins 190 includes two retaining pins 190, although other numbers of retaining pins 190 may be used.

The first corner assembly 105 (e.g., a left corner assembly), as shown in FIG. 4, can also be described as including a corner guard, where the corner guard includes the face plate 120 in an L-shaped configuration with another plate. In some embodiments, the first lock tab 145, retaining pins 180, guard plate 125, and lock guard 160 are all welded to the corner guard of the first corner assembly 105. Similarly, the second lock tab 150, retaining pins 190, and guard plate 135 may all be welded to the corner guard of the second corner assembly 110 (e.g., a right corner assembly). The first corner assembly 105 and the right corner assembly 110 may differ in that the guard plates 125 and 135 are attached to the top of one assembly and the bottom of the other. In the figures, the first guard plate 125 is shown as being attached to the bottom of the first corner assembly 105 and the second guard plate 135 is shown at the top of the second corner assembly 110, but the reverse is also possible.

Figure 7:
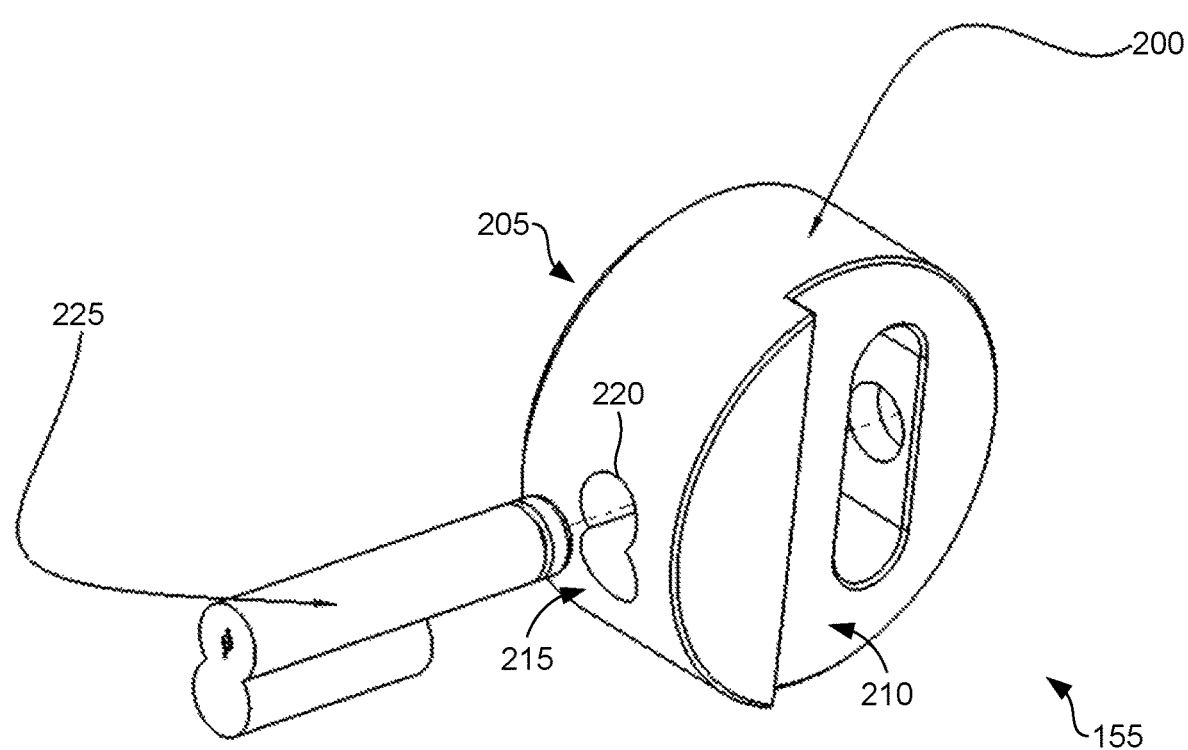
FIG. 7 shows an enhanced perspective view of a puck-type lock that can be used with the channel hitch lock according to various embodiments of the present disclosure.

FIG. 7 shows an enhanced perspective view of a puck-type lock 155 that can be used with the channel hitch lock 100 according to various embodiments of the present disclosure. As noted above, the puck-type lock 155 may include a hidden shackle style lock. To this end, the puck-type lock 155 may include substantially cylindrical housing having a top surface, a bottom surface, and a curved side surface.

The puck-type lock 155 comprises a housing 200 having a generally circular cross-section with a generally circular front portion 205, a generally circular rear portion 210, and a generally cylindrical side surface 215. However, in alternative embodiments, the front portion 205, the rear portion 210, and the side surface 215 may assume other shapes. In some embodiments, the side surface 215 of the puck-type lock 155 may include a side cavity 220 to insert a locking mechanism, such as a key (not shown), or a shaft 225 in the puck-type lock 155. For instance, one or more keys may also accompany the puck-type lock 155. The keys may be used to lock and unlock the puck-type lock 155 as well as the channel hitch lock 100. It is understood that the shaft 220 will extend through the first lock eye 147 and the second lock eye 152 to lock the channel hitch lock 100 until a key is used to remove the shaft 220.

Figure 8:
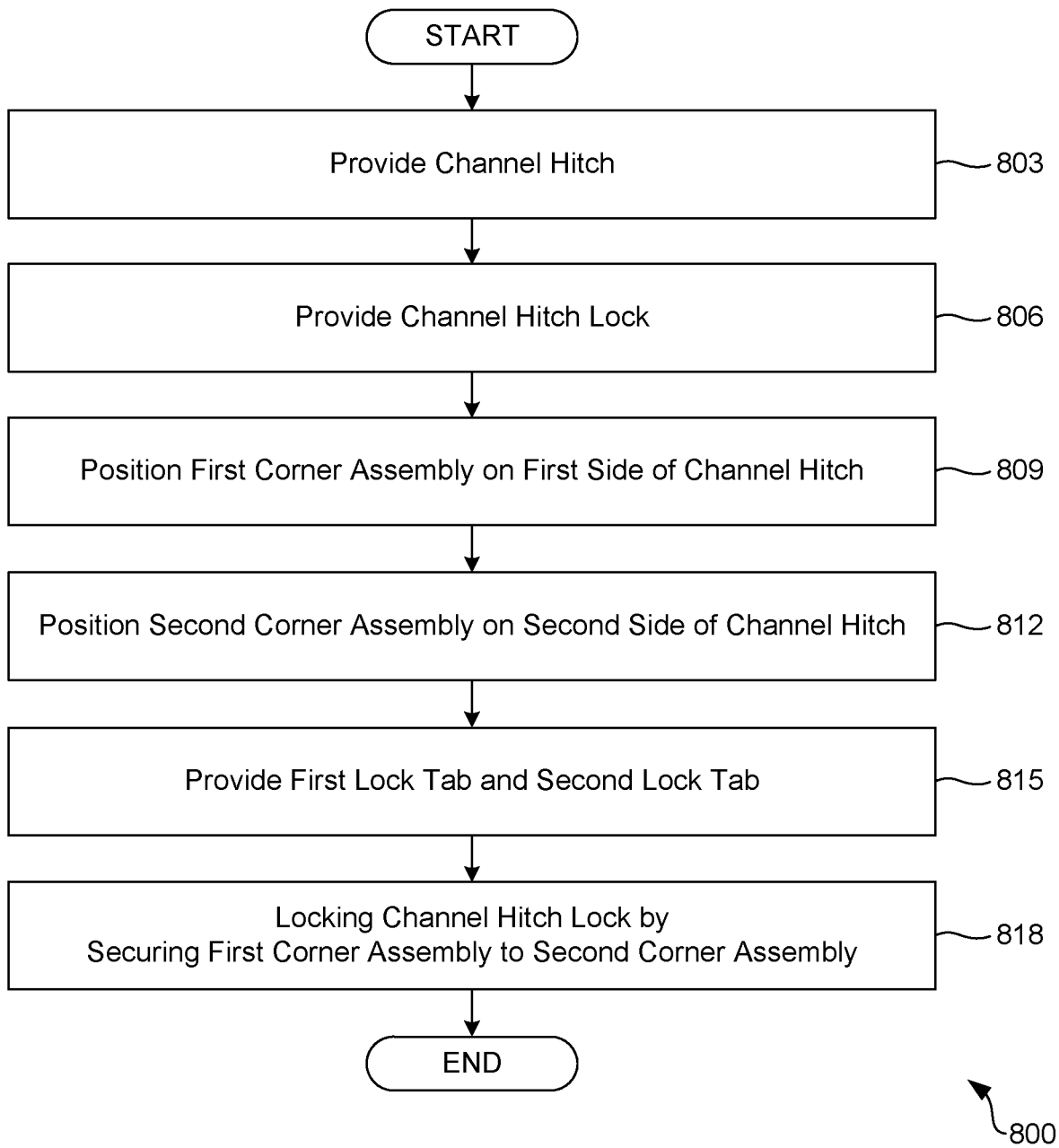
FIG. 8 is a flowchart illustrating an example method of assembly and/or using the channel hitch lock according to various embodiments.

Referring now to FIG. 8, a flowchart 800 is shown illustrating an example method of assembly and/or using the channel hitch lock 100 according to various embodiments. According to various embodiments, a method is provided. In step 803, a channel hitch is provided, such as the channel hitch 20 shown in FIG. 1.

In step 806, a channel hitch lock is provided comprising the first corner assembly 105 configured to engage with a first side 35 of a channel hitch 20 and covers at least a portion of the channel hitch 20, the first corner assembly 105 having a bottom projection 125 (or bottom guard plate) configured to encapsulate a bottom recess 65 of the channel hitch 20; a second corner assembly 110 configured to couple with the first corner assembly 105 and together, encapsulate at least an entire front portion of the channel hitch 20, where the second corner assembly 110 is further configured to engage with a second side 40 of the channel hitch 20 and cover a second portion of the channel hitch 20. The second corner assembly 110 and a top projection 135, can be configured to encapsulate a top recess 60 of the channel hitch 20. The channel hitch lock 100 may include a lock, such as the puck-type lock 155, configured to couple to the channel hitch lock 100 and retain the first corner assembly 105 with the second corner assembly 110 in a mated configuration. The mated or assembled configuration is shown in FIG. 3.

Thereafter, in step 809, the method includes positioning the first corner assembly 105 on the first side 35 of the channel hitch 20. In step 812, the method includes positioning the second corner assembly 110 on the second side 40 of the channel hitch 20 such that the entire front portion of the channel hitch 20 is encapsulated.

In some embodiments, in step 815, the method further includes providing a first lock tab 145 projecting from the first corner assembly 105, and providing a second lock tab 150 projecting from the second corner assembly 110. Additionally, in some embodiments, the method may include providing a lock guard 160 configured to encapsulate the first lock tab 145, the second lock tab 150, and a lock (e.g., the puck-type lock 155). In step 818, the method includes the first corner assembly to the second corner assembly using a lock, such as the puck-type lock 155.

In some embodiments, the lock is a puck-type lock 155 having a circular body, and the lock guard 160 further comprises a circular lock guard projecting annularly from a front surface of the first corner assembly 105. The circular lock guard 106 is configured to closely conform to and extend along a circumference of the puck-type lock 155. Further, the circular lock guard 160 may include an aperture 165 allowing for access of the side cavity 220 on the side surface 215 of the puck-type lock 155.

As noted above, in some embodiments, the first corner assembly 105 may include a first plurality of retaining pins 180 positioned on an interior surface 185 of the first corner assembly 105, where the first plurality of retaining pins 180 are configured to be positioned in a first plurality of holes 50 on a first side 35 of the channel hitch 20. Similarly, the second corner assembly 110 may include a second plurality of retaining pins 190 positioned on an interior surface 195 of the second corner assembly 110, where the second plurality of retaining pins 190 are configured to be positioned in a second plurality of holes 50 on a second side 40 of the channel hitch 20.

Accordingly, in some embodiments, the method may further include positioning the first plurality of retaining pins 180 into the first plurality of holes 50 on the first side 35 of the channel hitch 20, for instance, to secure the first corner assembly 105 to the channel hitch 20. Additionally, in some embodiments, the method may further include positioning the second plurality of retaining pins 190 into the first plurality of holes 50 on the second side 40 of the channel hitch 20, for instance, to secure the second corner assembly 110 to the channel hitch 20. Thereafter, the process can proceed to completion.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A channel hitch lock, comprising:
a first corner assembly configured to engage with a first side of a channel hitch and cover at least a portion of the channel hitch, the first corner assembly having a bottom projection configured to encapsulate a bottom recess of the channel hitch;
a second corner assembly configured to couple with the first corner assembly and together encapsulate at least an entire front portion of the channel hitch, wherein the second corner assembly is further configured to engage with a second side of the channel hitch and cover a second portion of the channel hitch, the second corner assembly having a top projection configured to encapsulate a top recess of the channel hitch;
a first lock tab projecting from the first corner assembly;
a second lock tab projecting from the second corner assembly;
a puck-type lock configured to couple to the channel hitch lock and retain the first corner assembly with the second corner assembly in a mated configuration; and
a lock guard configured to encapsulate a first lock eye, a second lock eye, and the puck-type lock.

2. The channel hitch lock of claim 1, wherein:
the puck-type lock has a circular body; and
the lock guard further comprises a circular lock guard projecting from a front surface of the first corner assembly, the circular lock guard being configured to extend along a circumference of the puck-type lock.

3. The channel hitch lock of claim 2, wherein:
the circular lock guard comprises an aperture; and
the puck-type lock has a projection having a width substantially similar to a width of the aperture, the projection being configured to nest in the aperture when the puck-type lock is engaged within the circular lock guard.

4. The channel hitch lock of claim 1, wherein:
the first corner assembly comprises a first plurality of retaining pins positioned on an interior surface of the first corner assembly, the first plurality of retaining pins being configured to be positioned in a first plurality of holes on the first side of the channel hitch; and
the second corner assembly comprises a second plurality of retaining pins positioned on an interior surface of the second corner assembly, the second plurality of retaining pins being configured to be positioned in a second plurality of holes on the second side of the channel hitch.

5. A channel hitch lock, comprising:
a first corner assembly configured to engage with a first side of a channel hitch and cover at least a portion of the channel hitch, the first corner assembly having a bottom projection configured to encapsulate a bottom recess of the channel hitch;
a second corner assembly configured to couple with the first corner assembly and together encapsulate at least an entire front portion of the channel hitch, wherein the second corner assembly is further configured to engage with a second side of the channel hitch and cover a second portion of the channel hitch, the second corner assembly having a top projection configured to encapsulate a top recess of the channel hitch; and
a lock configured to couple to the channel hitch lock and retain the first corner assembly with the second corner assembly in a mated configuration.

6. The channel hitch lock of claim 5, wherein the lock comprises a puck-type lock.

7. The channel hitch lock of claim 5, further comprising:
a first lock tab projecting from the first corner assembly; and
a second lock tab projecting from the second corner assembly.

8. The channel hitch lock of claim 7, further comprising a lock guard configured to encapsulate a first lock eye, a second lock eye, and the lock.

9. The channel hitch lock of claim 5, wherein:
the lock is a puck-type lock having a circular body; and
a lock guard further comprises a circular lock guard projecting from a front surface of the first corner assembly, the circular lock guard being configured to extend along a circumference of the puck-type lock.

10. The channel hitch lock of claim 9, wherein:
the circular lock guard comprises an aperture; and
the puck-type lock has a projection having a width substantially similar to a width of the aperture, the projection being configured to nest in the aperture when the puck-type lock is engaged within the circular lock guard.

11. The channel hitch lock of claim 5, wherein:
the first corner assembly comprises a first plurality of retaining pins positioned on an interior surface of the first corner assembly, the first plurality of retaining pins being configured to be positioned in a first plurality of holes on the first side of the channel hitch; and
the second corner assembly comprises a second plurality of retaining pins positioned on an interior surface of the second corner assembly, the second plurality of retaining pins being configured to be positioned in a second plurality of holes on the second side of the channel hitch.

12. A method, comprising:
providing a channel hitch lock, comprising:
a first corner assembly configured to engage with a first side of a channel hitch and cover at least a portion of the channel hitch, the first corner assembly having a bottom projection configured to encapsulate a bottom recess of the channel hitch;
a second corner assembly configured to couple with the first corner assembly and together encapsulate at least an entire front portion of the channel hitch, wherein the second corner assembly is further configured to engage with a second side of the channel hitch and cover a second portion of the channel hitch, the second corner assembly having a top projection configured to encapsulate a top recess of the channel hitch; and
a lock configured to couple to the channel hitch lock and retain the first corner assembly with the second corner assembly in a mated configuration;
positioning the first corner assembly on the first side of the channel hitch;

positioning the second corner assembly on the second side of the channel hitch such that the entire front portion of the hitch is encapsulated; and locking the first corner assembly to the second corner assembly.

13. The method of claim 12, wherein the lock comprises a puck-type lock.

14. The method of claim 12, further comprising:

providing a first lock tab projecting from the first corner assembly; and providing a second lock tab projecting from the second corner assembly.

15. The method of claim 14, further comprising providing a lock guard configured to encapsulate a first lock eye, a second lock eye, and the lock.

16. The method of claim 15, wherein:

the lock is a puck-type lock having a circular body; and the lock guard further comprises a circular lock guard projecting from a front surface of the first corner assembly, the circular lock guard being configured to extend along a circumference of the puck-type lock.

17. The method of claim 16, wherein:

the circular lock guard comprises an aperture; and the puck-type lock has a projection having a width substantially similar to a width of the aperture, the projection being configured to nest in the aperture when the puck-type lock is engaged within the circular lock guard.

18. The method of claim 12, wherein:

the first corner assembly comprises a first plurality of retaining pins positioned on an interior surface of the first corner assembly, the first plurality of retaining pins being configured to be positioned in a first plurality of holes on a first side of the channel hitch;

the second corner assembly comprises a second plurality of retaining pins positioned on an interior surface of the second corner assembly, the second plurality of retaining pins being configured to be positioned in a second plurality of holes on a second side of the channel hitch; and the method further comprises:

positioning the first plurality of retaining pins into the first plurality of holes on the first side of the channel hitch; and positioning the second plurality of retaining pins into the second plurality of holes on the second side of the channel hitch.

* * * * *